United States Patent [19]

Minervino, Jr. et al.

[11] Patent Number: 5,553,131
[45] Date of Patent: Sep. 3, 1996

[54] PROVIDING THE MOST COST-EFFECTIVE LONG-DISTANCE TELEPHONE SERVICE BASED ON MILAGE BAND RATES

[75] Inventors: Richard J. Minervino, Jr., Branford; Charles J. Veranis, Meriden; Anthony J. Andrade, Wolcott, all of Conn.

[73] Assignee: Mountain International Corporation, Wallingford, Conn.

[21] Appl. No.: 89,264

[22] Filed: Jul. 9, 1993

[51] Int. Cl.$^6$ ................................................ H04M 15/18
[52] U.S. Cl. .................... 379/221; 379/112; 379/131; 379/133; 379/200
[58] Field of Search .................... 379/112, 131, 379/133, 200, 220–221

[56] References Cited

U.S. PATENT DOCUMENTS

| | | | |
|---|---|---|---|
| 4,122,308 | 10/1978 | Weinberger et al. | 179/18 B |
| 4,410,765 | 10/1983 | Hestad | 379/112 |
| 4,525,601 | 6/1985 | Barnich et al. | 179/11 |
| 4,585,904 | 4/1986 | Mincone | 379/200 |
| 4,751,728 | 6/1988 | Treat | 379/113 |
| 4,920,562 | 4/1990 | Hird et al. | 379/132 |
| 4,972,464 | 11/1990 | Webb et al. | 379/207 |
| 4,979,207 | 12/1990 | Baum et al. | 379/112 |
| 5,008,929 | 4/1991 | Olsen et al. | 379/112 |
| 5,027,388 | 6/1991 | Bradshaw et al. | 379/112 |
| 5,103,475 | 4/1992 | Shuen | 379/115 |
| 5,303,297 | 4/1994 | Hillis | 379/133 |

Primary Examiner—James L. Dwyer
Assistant Examiner—Fan Tsang
Attorney, Agent, or Firm—Clifford L. Tager

[57] ABSTRACT

The present invention is directed to a billing system which provides the most cost-effective long-distance telephone service for long-distance telephone calls made by an account by analyzing long-distance telephone calls in the aggregate, comparing the cost thereof between at least two different providers, and charging the account based on the lowest cost. Providers of long-distance telephone services aggregate those long-distance telephone calls for which an account is responsible and determine the cost of service based either on mileage or aggregate time. In a first embodiment, the billing system compares the costs of service associated with two different service plans, both of which determine the cost of service based on mileage. In a second embodiment, the billing system compares the costs of service associated with two different service plans, one which determines the cost of service based on mileage, the other of which determines the cost of service based on aggregate time. To compare the cost between these two plans, the cost of all calls under the second plan is determined individually on an aggregate time basis, and the cost of the call is assigned to the appropriate mileage band based on its approximate mileage. After the cost of service under both plans are determined per mileage band, the cost under the first service plan is compared against the cost under the second service plan, for each mileage band. The lowest comparative cost associated with each mileage band is selected and accumulated, and the account's invoice is based thereon.

12 Claims, 5 Drawing Sheets

FIG. 4

DISTRIBUTION OF BILLABLE MINUTES

| MILEAGE RANGE | TOTAL TIME | PERCENTAGE |
|---|---|---|
| 55 | 54.9 | 37.6% |
| 292 | 4.8 | 3.2% |
| 430 | 0.9 | 0.6% |
| 925 | 60.3 | 41.3% |
| 1910 | 15.3 | 10.4% |
| 3000 | 9.7 | 6.6% |
| 9999 | 0.0 | 0.0% |
| TOTAL MINS | 145.8 | 100.0% |
| TOTAL HRS | 2.4 | |

— 410

— 402

PRE DISCOUNTED COST

| MILEAGE RANGE | PLAN A | PLAN B | PLAN C | PLAN D |
|---|---|---|---|---|
| 55 | 12.25 | 10.93 | 13.59 | 10.29 |
| 292 | 1.22 | 1.05 | 1.19 | 1.04 |
| 430 | 0.30 | 0.22 | 0.27 | 0.22 |
| 925 | 15.45 | 14.89 | 16.97 | 13.73 |
| 1910 | 4.05 | 3.93 | 4.42 | 3.60 |
| 3000 | 2.57 | 2.49 | 2.82 | 2.30 |
| 9999 | 0.00 | 0.00 | 0.00 | 0.00 |
| TOTAL | 35.84 | 33.51 | 39.26 | 31.18 |
| FEES | 5.00 | 0.00 | 0.00 | 2.50 |
| DISCOUNT | 0.00 | 0.00 | 0.00 | 0.00 |

404 — TOTAL
406 — FEES
408 — DISCOUNT

— 412

DISCOUNTED COST

| MILEAGE RANGE | PLAN A | PLAN B | PLAN C | PLAN D | COST TO ACCOUNT |
|---|---|---|---|---|---|
| 55 | 13.95 | 10.93* | 13.59 | 11.11 | 10.93 |
| 292 | 1.33 | 1.05* | 1.19 | 1.09 | 1.05 |
| 430 | 0.32 | 0.22* | 0.27 | 0.23 | 0.22 |
| 925 | 18.31 | 14.89* | 16.97 | 15.20 | 14.89 |
| 1910 | 4.25 | 3.93 | 4.42 | 3.70* | 3.70 |
| 3000 | 2.68 | 2.49 | 2.82 | 2.35* | 2.35 |
| 9999 | 0.00 | 0.00 | 0.00 | 0.00 | 0.00 |
| TOTALS | 40.84 | 33.51 | 39.26 | 33.68 | 33.14 |
| | 7.70 | 0.37 | 6.12 | 0.54 | SAVINGS * |

414

PROVIDING THE MOST COST-EFFECTIVE LONG-DISTANCE TELEPHONE SERVICE BASED ON MILAGE BAND RATES

BACKGROUND OF THE INVENTION

1. Technical Field

The present invention is directed to a telephone billing system. More particularly, the present invention is directed to providing the most cost-effective long-distance telephone service based on a comparison of at least two service plans.

2. Background Information

There are typically two types of long-distance telephone service providers: sellers and resellers. Sellers typically provide long-distance telephone service to individual accounts, such as companies, individuals and/or resellers. Resellers typically sell their service to a plurality of accounts and, in the aggregate, are able to obtain a volume discount from the seller which is passed along to their accounts. Thus, resellers can offer an account a volume discount rate regardless of the account's relative size, since the reseller obtains volume discounts by aggregating a plurality of accounts.

Each long-distance telephone service provider typically offers a variety of service plans, each plan being theoretically tailored to a specific type of account. Given the vast number of plans available, it is often very difficult for an account manager to analyze all possible service plans and to choose the absolute best plan for their needs. Further, given changing long-distance telephone usage by the account, the initial choice may not be the best choice as usage changes.

Systems are known which analyze what the cost of a call would be if placed by two different providers, and places the call with the provider who offers the lowest cost thereof. These systems, however, are inadequate for several reasons. They operate on a call-by-call basis, ignoring the advantages inherent in aggregating billing schemes. Additionally, they require a connection to both providers whose cost of the call is being compared. The latter requirement is not only costly, but becomes rather impractical where a plurality of providers are to be compared.

Accordingly, there is utility for a billing system which can analyze long-distance telephone calls in the aggregate, compare the cost thereof between at least two different providers, charge the account based on the lowest cost, and not require connection to those providers whose costs are being compared.

SUMMARY OF THE INVENTION

The present invention is directed to a billing system which provides the most cost-effective long-distance telephone service for long-distance telephone calls made by an account by analyzing long-distance telephone calls in the aggregate, comparing the cost thereof between at least two different providers, charging the account based on the lowest cost, and does not require connection to those providers whose costs are being compared.

In the billing system of the present invention, a call record is generated for each long-distance telephone call for which an account is responsible. Each call record includes the origination telephone number, destination telephone number, start time and date, and duration of the long-distance telephone call.

Providers of long-distance telephone services aggregate those long-distance telephone calls for which an account is responsible and determine the cost of service based either on mileage or aggregate time.

Those providers which determine the cost of service based on mileage typically do so by approximating the distance between the originating call and the destination call, placing the call duration of each call in one of a plurality of predetermined mileage bands based on the call's approximate mileage, aggregating the duration of those calls within each mileage band, determining the cost associated with each mileage band by multiplying the time duration within the mileage band by a cost factor per unit time, and adding up the costs associated with each mileage band.

Those providers which determine the cost of service based on aggregate time typically do so by taking calls placed in chronological order, adding the duration of the specific call to the duration of calls made previously thereto, and multiplying the duration of the call in question by a variable cost factor per unit time to get the cost of the call. The cost of all calls are calculated, and the cost of service is based on the aggregate thereof. The variable cost factor provides the volume discount since the cost factor per unit time decreases as the total duration of calls increases.

In a first embodiment of the present invention, the billing system includes a method which compares the costs of service associated with two different service plans, both of which determine the cost of service based on mileage. The approximate distance between the location of the origination telephone number and the location of the destination telephone number for each call is determined, and the time duration associated with each call is accumulated within the appropriate predetermined mileage band.

After all relevant call records have been processed, the cost associated with each mileage band is calculated for the two service plans, based on the accumulated time duration therewithin and a predetermined fee schedule set by the first and the second service plan.

The cost of service under the first service plan is compared against the cost of service under the second service plan, for each mileage band. The lowest comparative cost associated with each mileage band is selected and accumulated, and the account's invoice is based thereon. Thus, the account's invoice is comprised of the aggregate of the lowest mileage band costs, independent of which service provider is actually used. Accordingly, the account gains the benefit of obtaining the lowest rates, on a mileage band basis, for all relevant calls.

In a second embodiment of the present invention, the billing system includes a method which compares the costs of service associated with two different service plans, one which determines the cost of service based on mileage, the other of which determines the cost of service based on aggregate time.

In order to compare the cost of service between these two plans, the cost of service under the first plan is determined on the mileage band basis, as above. The cost of service under the second plan is determined on the aggregate time basis, by adding the duration of the specific call to the duration of those calls made previously, multiplying the duration of the specific call by a variable cost factor per unit time, where the variable cost factor decreases as the accumulative duration of calls made previously increases. The cost associated with the specific call is then assigned to the appropriate mileage band based on the approximate mileage of the specific call, and the costs assigned to each mileage band are added together to get the cost associated therewith.

After the cost of service under both plans are set forth on a mileage band basis, the cost of service under the first service plan is compared against the cost of service under the second service plan, for each mileage band. The lowest comparative cost associated with each mileage band is selected and accumulated, and the account's invoice is based thereon.

Optionally, any service fees or discounts set by the respective service plan is factored into the respective cost of services, preferably on a pro rata basis per mileage band.

For example, where the cost of the service plan is based on mileage, the percentage of time accumulated within each mileage band is determined relative to the total time duration accumulated within all of the mileage bands, and any service fees or discounts are apportioned into each mileage band on a pro rata basis based on its determined percentage of time.

Where the cost of the service plan is based on aggregate time, the percentage of cost accumulated within each mileage band is determined relative to the total cost accumulated within all of the mileage bands, and any service fees or discounts are apportioned into each mileage band on a pro rata basis based on its determined percentage of cost.

BRIEF DESCRIPTION OF THE DRAWINGS

FIG. 4 depicts an invoice summary of an account based on the billing system of the present invention.

DESCRIPTION OF THE PREFERRED EMBODIMENT(S)

Figure 1:
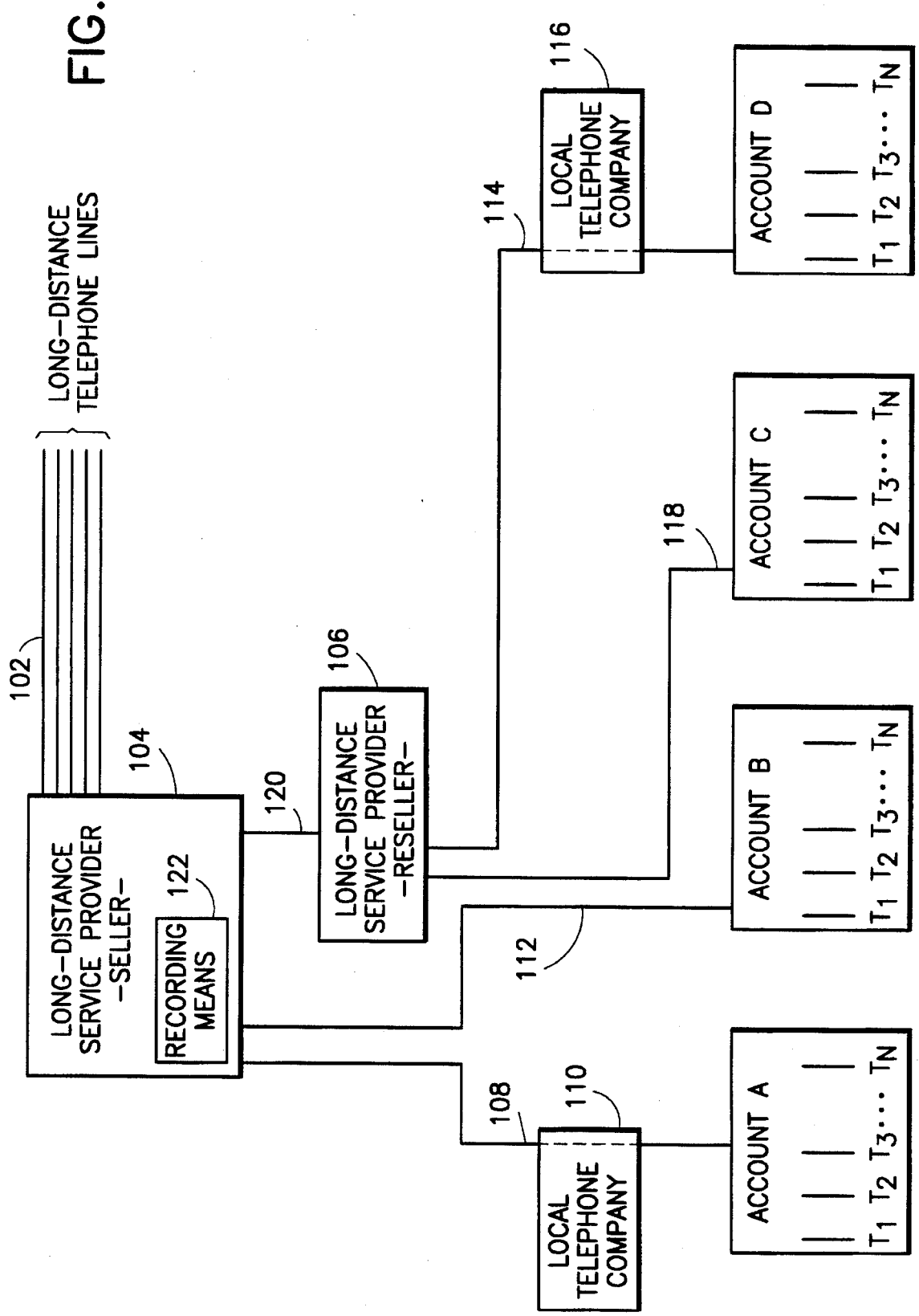
FIG. 1 is a diagram of the relationship between long-distance service providers and various accounts.

Turning now to FIG. 1, a diagram of the relationship between long-distance service providers and various accounts is depicted. Accounts are typically connected to long-distance lines 102 either through sellers 104 or resellers 106 of long-distance services.

Where an account is connected through a seller, the connection may either be via an equal-access line or a dedicated line. An equal access line is the connection to a long-distance service provider via a local telephone company, while a dedicated line is the connection directly to the long-distance service provider.

As illustrated in FIG. 1, Account A is connected to seller 104 via equal-access line 108 provided by local telephone company 110, while Account B is connected directly to seller 104 via dedicated line 112. Similarly, Account D is connected to reseller 106 via equal-access line 114 provided by local telephone company 116, while Account C is connected directly to reseller 106 via dedicated line 118. Reseller 106 obtains connection to long-distance lines 102 via dedicated line 120 to seller 104.

Both seller 104 and reseller 106 offer a plurality of service plans to their accounts. The reseller, however, can group several of its accounts together to obtain a volume discount from the seller, thereby passing the savings along to its accounts.

Certain call information from all calls placed by the accounts serviced either directly or indirectly by the seller are recorded by recording means 122, as well known in the art. The call record information includes, for example, the origination telephone number, destination telephone number, start time and date, and duration of the long-distance telephone call. The portion of the call records for which the reseller is responsible is typically transmitted thereto by the seller via magnetic tape (not shown) on a periodic basis, e.g., monthly.

The billing system of the present invention allows sellers and/or resellers of long-distance telephone services to offer their accounts the most cost-effective plan, relative to those plans within the comparison. The plans to be compared may include plans offered exclusively by the seller, exclusively by the reseller, or any combination thereof.

The present invention preferably compares the cost of service of four plans for those calls made during daytime hours, as commonly defined in the art. It is to be understood that while the present invention is discussed with reference to a comparison of four plans, any number of plans may be compared thereby. Additionally, it is to be understood that while the present invention is discussed with reference to calls placed during daytime hours, other time durations may be employed, e.g., evening hours, night hours, a combination of any of the above, or any other time duration the user wishes to define.

Figure 2A:
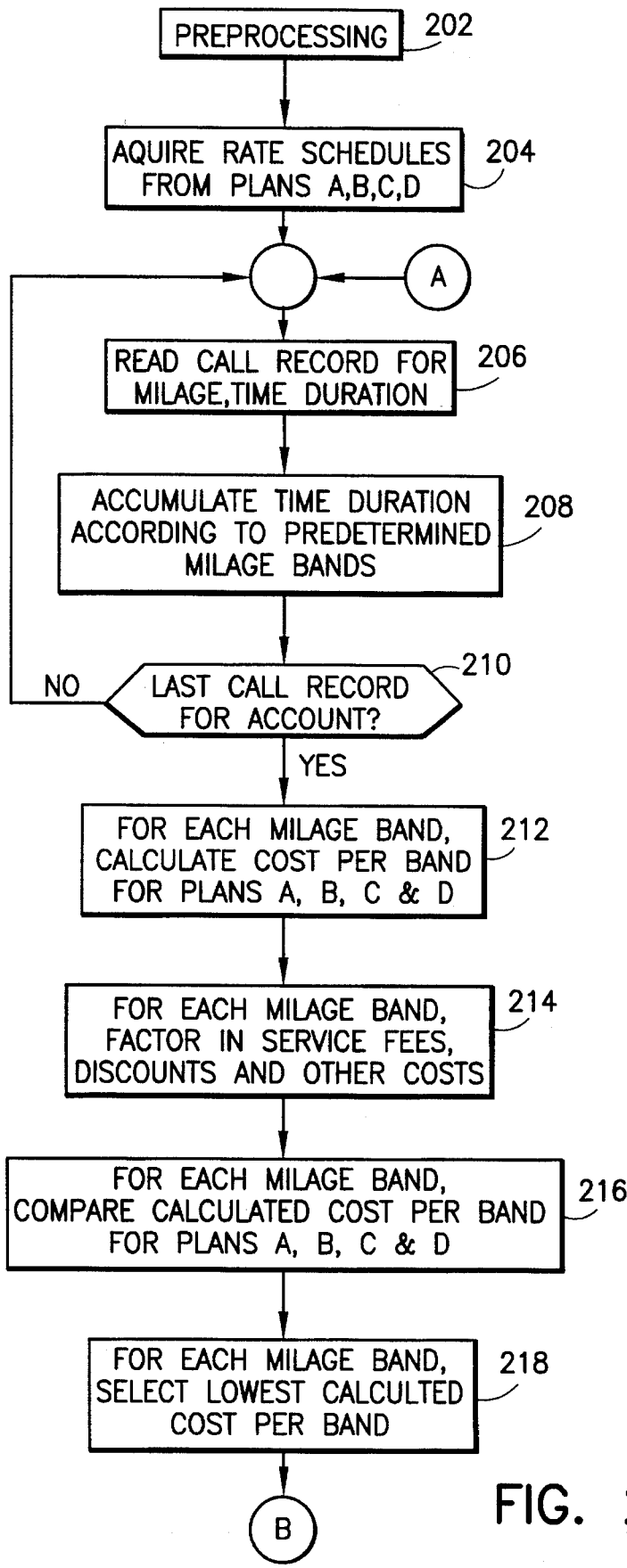
FIGS. 2A and 2B illustrate a flow diagram of the preferred embodiment of the billing system of the present invention.
Figure 2B:
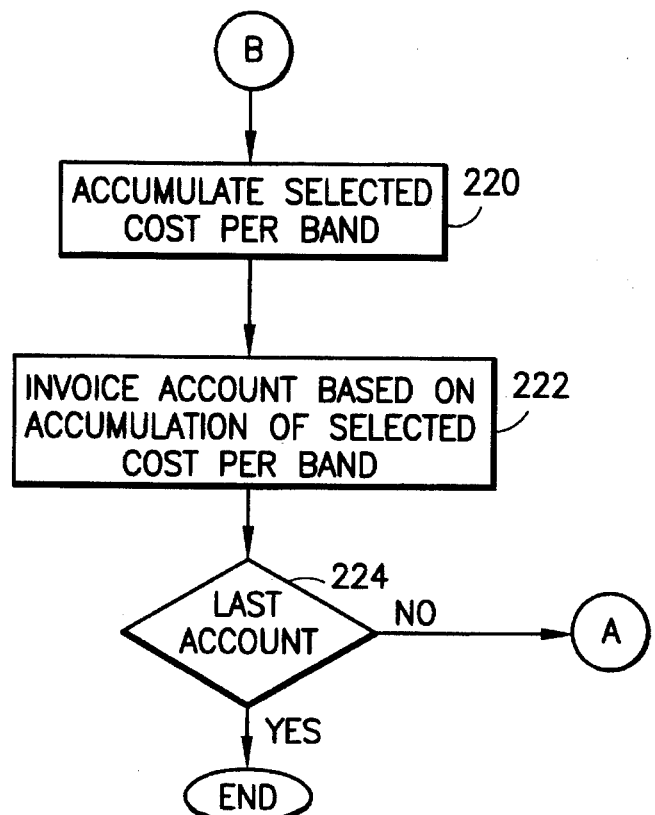

Turning now to FIGS. 2A and 2B, a flow diagram of the preferred embodiment of the billing system of the present invention is illustrated. The call records recorded by the seller's recording means 122 (FIG. 1 ) are preferably pre-processed at step 202.

Figure 3:
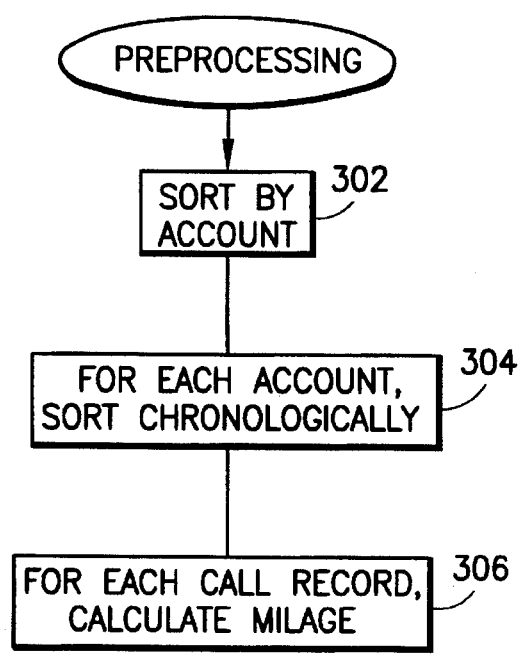
FIG. 3 illustrates a flow diagram of the preprocessing step shown in FIG. 2A.

With reference to FIG. 3, preprocessing step 202 preferably comprises the steps of sorting the call records by account (step 302), sorting the call records chronologically for each account (step 304), and determining the approximate distance between the originating telephone number and the destination telephone number (step 306). The mechanics of steps 302, 304 and 306 are well known in the art.

Returning to FIG. 2, the schedule of rates as published for each plan to be compared is preferably obtained at step 204. The schedule of rates are preferably updated on a periodic basis, e.g., monthly.

A call record is preferably read at step 206 to acquire the originating telephone number, the destination telephone number, and the duration of the call. The approximate distance between the originating and destination telephone numbers is calculated therefrom, the mechanics of which are well known to those skilled in the art.

Based on the approximate distance calculated in step 206, the time duration associated with the call is assigned to a particular mileage band in step 208, and the time durations within each mileage band are accumulated. The process of steps 206 and 208 continue for all calls records to be billed to a specific account, as indicated by step 210.

The mileage bands may be defined uniquely by the user. In the preferred embodiment, the mileage bands are the mileage bands typically used in the art, as shown in the following Table 1:

TABLE 1

0 to 55 miles
over 55 miles, up to 292 miles
over 292 miles, up to 430 miles
over 430 miles, up to 925 niiles
over 925 miles, up to 1910 miles
over 1910 miles, up to 3000 miles
over 3000 miles, up to 9999 miles
over 9999 miles At step 212, the cost of each mileage band is calculated for each plan to be compared. As discussed above, providers of long-distance telephone services determine the cost of service based either on mileage or aggregate time.

Figure 5:
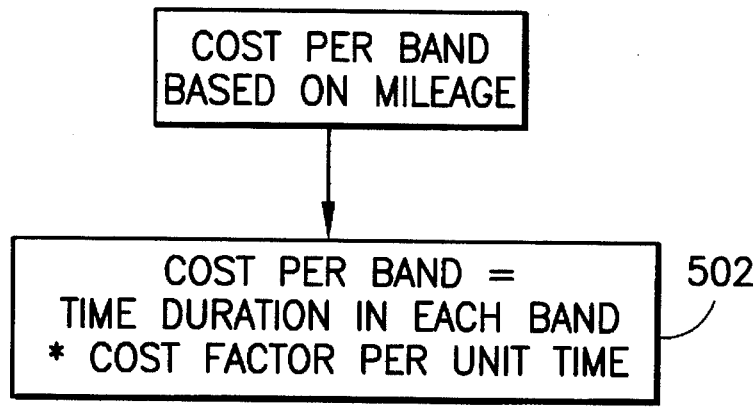
FIGS. 5 and 6 illustrate a first and a second preferred flow diagram of the cost per band step shown in FIG. 2A.

With reference to FIG. 5, where the provider of the plan determines the cost of service based on mileage, the cost of each mileage band under the plan in question is preferably calculated by multiplying the time duration within the mileage band by the cost factor per unit time obtained at step 204 (step 502).

Figure 6:
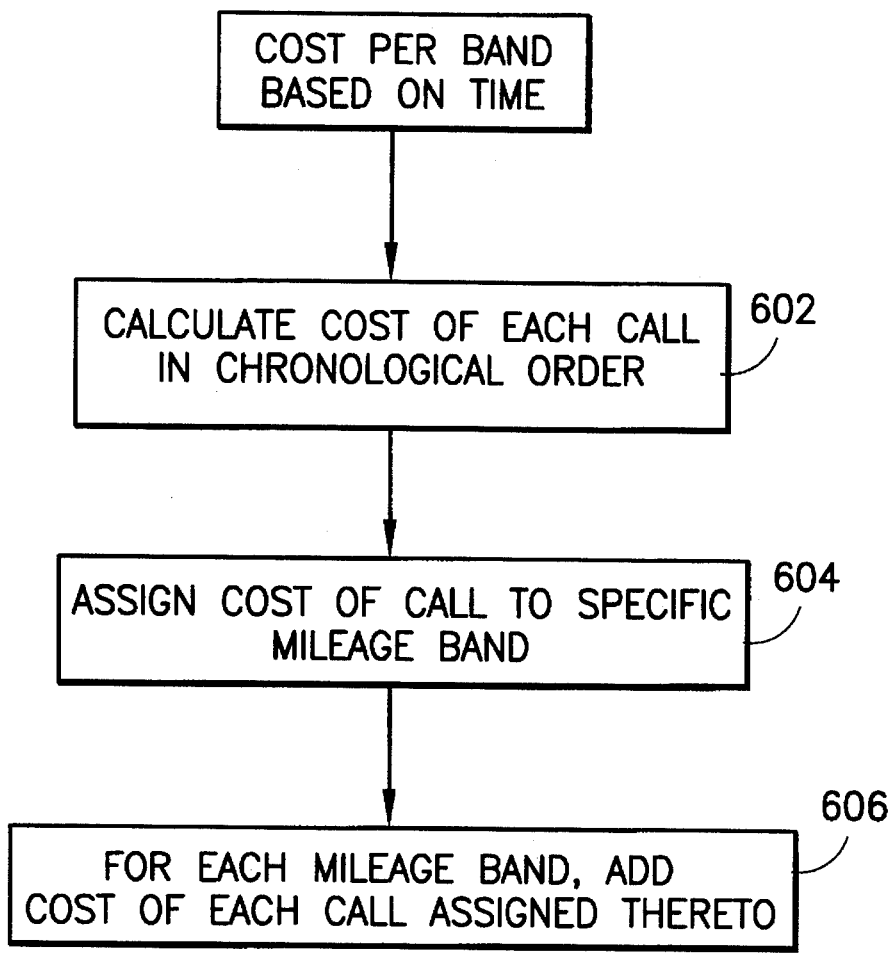

With reference to FIG. 6, where the provider of the plan determines the cost of service based on aggregate time, the cost of each mileage band under the plan in question is preferably calculated on a call-by-call basis in chronological order (step 602). The duration of the specific call is added to the duration of those calls made previously. Based on the aggregate call duration, a cost factor per unit time is selected from one of a possible set of cost factors.

As an example, Plan C determines the cost of service based on aggregate time and employs one of five cost factors per unit time depending on the aggregate time duration of calls placed previous to the specific call whose cost is being calculated. The first cost factor is selected for the first 25 hours of usage; a second cost factor is selected for usage between 25 and 50 hours; a third cost factor is selected for usage between 50 and 100 hours; a fourth cost factor is selected for usage between 100 and 200 hours; and a fifth cost factor is selected for usage over 200 hours. Typically, cost factor decreases as usage increases Once a cost factor per unit time is selected, the cost of the call is determined by multiplying the duration of the specific call by a selected cost factor per unit time. The cost associated with the specific call is then assigned to the appropriate mileage band based on the approximate mileage of the specific call (step 604), and the costs assigned to each mileage band are added together to get the cost associated therewith (step 606).

Returning now to FIG. 2A, the results of step 212 represent "prediscounted costs" as calculated according to each plan. Prediscounted costs are hereindefined as the cost of service before any service fees or discounts set by the respective service plan is factored into the respective cost of services.

With reference to FIG. 4, an invoice summary of an account based on the billing system of the present invention is depicted. As shown by reference 402, the prediscounted costs for four plans is shown, broken down by mileage band. The aggregate cost of service for each plan is shown by reference 404. Additionally, the applicable service fees and discounts charged or granted by each plan are shown via references 406 and 408, respectively.

The applicable service fees and discounts set by the respective service plan are optionally factored into the respective cost of services at step 214.

Where the cost of service is based on mileage, the percentage of time accumulated within each mileage band is determined relative to the total time duration accumulated within all of the mileage bands, and any service fees or discounts are apportioned into each mileage band on a pro rata basis based on its determined percentage of time.

With reference to FIG. 4, reference 410 sets forth the aggregate time per mileage band, as well as the percentage of time per mileage band relative to the total time.

Where the cost of service is based on aggregate time, the percentage of cost accumulated within each mileage band is determined relative to the total cost accumulated within all of the mileage bands, and any service fees or discounts are apportioned into each mileage band on a pro rata basis based on its determined percentage of cost.

At step 216, the cost per mileage band is compared for all service plans, and the lowest cost per mileage band is selected at step 218. The selected costs per mileage band are totalled at step 220, and an invoice for the account is generated at step 222 based on the accumulation of the lowest costs per mileage band.

Thus, the account's invoice is comprised of the aggregate of the lowest mileage band costs, independent of which service provider is actually used. Accordingly, the account gains the benefit of obtaining the lowest rates, on a mileage band basis, for all relevant calls.

The above process continues for all accounts, as depicted by step 224.

With reference to FIG. 4, reference 412 illustrates the cost of service under the service plans as determined by the steps of FIG. 2. As illustrated by asterisks, the total cost to be charged the account is the aggregate of the lowest cost of each mileage band. Additionally, the cost saved over each service plan is reflected by reference 414.

The billing system of the present invention is also the subject of a copyright registration bearing a Certificate of Registration Number TXu 554 901, the specimen attached thereto being herein incorporated by reference.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. In a long-distance telephone call billing system having an electronically stored call record for each of a plurality of long-distance telephone calls for an account, each call record including origination telephone number, destination telephone number, start time and date, and duration, a method of providing the benefit of the most cost-effective long-distance telephone service based on a comparison of at least a first service plan and a second service plan, said method comprising the steps of:

determining an approximate distance between the location of the origination telephone number and the location of the destination telephone number for each call;

accumulating the time duration of each call within one of a set of predetermined mileage bands based on the determined approximate distance of each call;

calculating a first cost associated with each mileage band for each mileage band in the set of predetermined mileage bands, based on the accumulated time duration within each of the respective mileage bands and a predetermined fee schedule set by the first service plan;

calculating a second cost associated with each mileage band for each mileage band in the set of predetermined mileage bands, based on the accumulated time duration within each of the respective mileage bands and a predetermined fee schedule set by the second service plan;

comparing the first calculated cost with the second calculated cost for each mileage band;

selecting the lowest calculated cost between the first and the second calculated cost for each mileage band;

accumulating the selected lowest calculated cost for each mileage band; and invoicing the account based on the accumulated lowest calculated cost for each mileage band, thereby providing the benefit of the most cost-effective long-distance telephone service to the account based on a comparison of the first and the second service plans.

2. The method of claim 1, wherein the step of calculating the first cost associated with each mileage band comprises the step of multiplying the accumulated time duration within each mileage band with a mileage band cost per unit time factor set by the first service plan.

3. The method of claim 1, wherein the step of calculating the second cost associated with each mileage band comprises the step of multiplying the accumulated time duration within each mileage band with a mileage band cost per unit time factor set by the second service plan.

4. The method of claim 1, said method further comprising the step of factoring into the respective costs associated with each mileage band any service fees or discounts set by the respective service plan.

5. The method of claim 4, wherein said step of factoring comprises the steps of:

determining the percentage of time accumulated within each mileage band relative to the total time duration accumulated within all of the mileage bands; and apportioning any service fees or discounts into each mileage band on a pro rata basis based on its determined percentage of time.

6. In a long-distance telephone call billing system having an electronically stored call record for each of a plurality of long-distance telephone calls for an account, each call record including origination telephone number, destination telephone number, start time and date, and duration, a method of providing the benefit of the most cost-effective long-distance telephone service based on a comparison of at least a first service plan and a second service plan, said method comprising the steps of:

sorting the call records in chronological order;

determining an approximate distance between the location of the origination telephone number and the location of the destination telephone number for each call;

accumulating the time duration of each call within one of a set of predetermined mileage bands based on the determined approximate distance of each call;

calculating a first cost associated with each mileage band for each mileage band in the set of predetermined mileage bands, based on the accumulated time duration within each of the respective mileage bands and a predetermined fee schedule set by the first service plan;

calculating a second cost associated with each mileage band for each mileage band in the set of predetermined mileage bands, based on the chronology of the calls, the time duration of the calls, the determined approximate distance of each call, and a predetermined fee schedule set by the second service plan;

comparing the first calculated cost with the second calculated cost for each mileage band;

selecting the lowest calculated cost between the first and the second calculated cost for each mileage band;

accumulating the selected lowest calculated cost for each mileage band; and invoicing the account based on the accumulated lowest calculated cost for each mileage band, thereby providing the benefit of the most cost-effective long-distance telephone service to the account based on a comparison of the first and the second service plans.

7. The method of claim 6, wherein the step of calculating the first cost associated with each mileage band comprises the step of multiplying the accumulated time duration within each mileage band with a mileage band cost per unit time factor set by the first service plan.

8. The method of claim 6, wherein the step of calculating the second cost associated with each mileage band comprises the steps of:

calculating the cost of each call in chronological order based on the predetermined fee schedule set by the second service plan;

assigning the calculated cost of each call to a specific mileage band based on the determined approximate distance of each call; and accumulating within each mileage band the calculated costs of each call assigned thereto.

9. The method of claim 6, wherein the step of calculating the second cost associated with each mileage band comprises calculating the cost of each call chronologically, comprising the steps of:

adding the duration of the specific call to the duration of those calls made previously thereto;

multiplying the duration of the specific call by a variable cost factor per unit time, wherein said variable cost factor decreases as the accumulative duration of calls made previously increases; and assigning the cost associated with the specific call to the appropriate mileage band based on the approximate mileage of the specific call; and for each mileage band, adding the costs assigned thereto.

10. The method of claim 6, said method further comprising the step of factoring into the respective costs associated with each mileage band any service fees or discounts set by the respective service plan.

11. The method of claim 10, wherein said step of factoring comprises the steps of:

determining the percentage of time accumulated within each mileage band relative to the total time duration accumulated within all of the mileage bands; and apportioning any service fees or discounts into each mileage band on a pro rata basis based on its determined percentage of time.

12. The method of claim 10, wherein said step of factoring comprises the steps of:

determining the percentage of cost accumulated within each mileage band relative to the total time cost accumulated within all of the mileage bands; and apportioning any service fees or discounts into each mileage band on a pro rata basis based on its determined percentage of cost.

* * * * *